(12) United States Patent
Ochi et al.

(10) Patent No.: US 11,952,446 B2
(45) Date of Patent: Apr. 9, 2024

(54) DECORATIVE FILM AND METHOD FOR PRODUCING DECORATIVE FILM-ATTACHED THREE DIMENSIONAL MOLDED PRODUCT

(71) Applicant: AGC Inc., Chiyoda-ku (JP)

(72) Inventors: Shuhei Ochi, Chiyoda-ku (JP); Tomoaki Gomi, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 965 days.

(21) Appl. No.: 16/905,972

(22) Filed: Jun. 19, 2020

(65) Prior Publication Data

US 2020/0317835 A1    Oct. 8, 2020

Related U.S. Application Data

(63) Continuation of application No. PCT/JP2018/046975, filed on Dec. 20, 2018.

(30) Foreign Application Priority Data

Dec. 20, 2017 (JP) .................................. 2017-243932

(51) Int. Cl.
  *C08F 214/26* (2006.01)
  *B29C 65/48* (2006.01)
  (Continued)

(52) U.S. Cl.
  CPC .......... *C08F 214/267* (2013.01); *B29C 65/48* (2013.01); *B32B 7/12* (2013.01); *B32B 27/08* (2013.01); *B32B 27/32* (2013.01); *B32B 27/36* (2013.01); *C08J 7/0427* (2020.01); *C08L 27/18* (2013.01); *B29L 2009/00* (2013.01);
  (Continued)

(58) Field of Classification Search
  None
  See application file for complete search history.

(56) References Cited

U.S. PATENT DOCUMENTS

2017/0247563 A1* 8/2017 Saito ..................... C09D 5/035
2017/0348953 A1* 12/2017 Takamatsu ................ B32B 7/12

FOREIGN PATENT DOCUMENTS

EP     3 632 675 A1    4/2020
JP     H10183027 A     7/1998
(Continued)

OTHER PUBLICATIONS

International Search Report dated Mar. 19, 2019 in PCT/JP2018/046975 filed on Dec. 20, 2018, 2 pages.

*Primary Examiner* — Ramsey Zacharia
(74) *Attorney, Agent, or Firm* — Element IP, PLC (57) ABSTRACT

To provide a decorative film whereby formation of wrinkles is suppressed when attached to a three dimensional molded product in a stretched state, and a method for producing a decorative film-attached three dimensional molded product. The decorative film of the present invention is a decorative film having at least a base film and a top layer containing a fluorinated polymer, the top layer being disposed on one surface, wherein the surface reflection intensity Wa at a wavelength of from 0.1 to 0.3 mm and the surface reflection intensity Wb at a wavelength of from 0.3 to 1.0 mm, of the top layer as measured by using a wave scan apparatus in such a state that the decorative film is stretched by 1.5 times, are both at most 30.0.

13 Claims, 1 Drawing Sheet

(51) Int. Cl.
*B32B 7/12* (2006.01)
*B32B 27/08* (2006.01)
*B32B 27/32* (2006.01)
*B32B 27/36* (2006.01)
*C08J 7/04* (2020.01)
*C08L 27/18* (2006.01)
*B29L 9/00* (2006.01)

(52) U.S. Cl.
CPC ..... *B32B 2307/416* (2013.01); *B32B 2451/00* (2013.01); *B32B 2605/003* (2013.01); *C08J 2327/18* (2013.01); *C08J 2367/02* (2013.01); *C08J 2427/12* (2013.01); *C08J 2427/18* (2013.01); *C08L 2203/16* (2013.01); *C08L 2205/025* (2013.01); *C08L 2207/04* (2013.01)

(56) References Cited

FOREIGN PATENT DOCUMENTS

| | | | |
|---|---|---|---|
| JP | 2014-184726 A | 10/2014 | |
| WO | WO-2016080220 A1 * | 5/2016 | ............... B05D 1/06 |
| WO | WO 2018/079775 A1 | 5/2018 | |

* cited by examiner

DECORATIVE FILM AND METHOD FOR PRODUCING DECORATIVE FILM-ATTACHED THREE DIMENSIONAL MOLDED PRODUCT

TECHNICAL FIELD

The present invention relates to a decorative film and a method for producing a decorative film-attached three dimensional molded product.

BACKGROUND ART

On the surface of a three dimensional molded product to be used in the field of interior and exterior members for automobiles, there is a case where decoration by a decorative film is applied for the purpose of imparting a design property or for protection of the surface. In Patent Document 1, a decorative film having a layer containing a polyvinylidene fluoride is disclosed.

PRIOR ART DOCUMENT

Patent Document

Patent Document 1: JP-A-2014-184726

DISCLOSURE OF INVENTION

Technical Problem

The above decorative film is bonded to a three dimensional molded product while being stretched or in a stretched state. However, it has been found that when the decorative film having a layer containing a polyvinylidene fluoride as described in Patent Document 1, was bonded to a three dimensional molded product while being stretched or in a stretched state, there was a case where wrinkles were formed in the decorative film.

In view of the above problem, it is an object of the present invention to provide a decorative film whereby formation of wrinkles is suppressed when bonded to a three-dimensional molded product while being stretched or in a stretched state, and a method for producing a decorative film-attached three dimensional molded product.

Solution to Problem

The present inventors have made intensive studies on the above problem and, as a result, have found it possible to obtain a desired effect if a decorative film is used, of which the surface reflection intensity Wa at a wavelength of from 0.1 to 0.3 mm, and the surface reflection intensity Wb at a wavelength of from 0.3 to 1.0 mm, of the top layer as measured by using a wave scan apparatus, in such a state that the decorative film is stretched by 1.5 times, are both at most 30, and thus, they have arrived at the present invention.

That is, the present inventors have found it possible to solve the above problem by the following constructions.

[1] A decorative film having a base film and a top layer containing a fluorinated polymer, said top layer being disposed on one surface, characterized in that the surface reflection intensity Wa at a wavelength of from 0.1 to 0.3 mm, and the surface reflection intensity Wb at a wavelength of from 0.3 to 1.0 mm, of the top layer as measured by using a wave scan apparatus, in such a state that the decorative film is stretched by 1.5 times, are both at most 30.0.

[2] The decorative film according to [1], wherein the surface reflection intensity Wc at a wavelength of from 1.0 to 3.0 mm, and the surface reflection intensity Wd at a wavelength of from 3.0 to 10.0 mm, of the top layer as measured by using a wave scan apparatus, in such a state that the decorative film is stretched by 1.5 times, are both at most 30.0.

[3] The decorative film according to [2], wherein the arithmetic mean value of Wa, Wb, Wc and Wd is at most 25.0.

[4] The decorative film according to any one of [1] to [3], wherein the standard deviation when the 60 degree specular gloss of the top layer is measured at 20 points in such a state that the decorative film is stretched by 1.5 times, is from 0.1 to 0.5.

[5] The decorative film according to any one of [1] to [4], wherein the standard deviation when the film thickness of the decorative film is measured at 20 points in such a state that the decorative film is stretched by 1.5 times, is from 0.1 to 0.5 μm.

[6] The decorative film according to any one of [1] to [5], wherein the fluorinated polymer is a polymer having crosslinkable groups, which comprises units based on a fluoroolefin, units based on a monomer selected from the group consisting of a vinyl ether, a vinyl ester, an allyl ether, an allyl ester and a (meth)acrylic acid ester, and units having a crosslinkable group, wherein the content of the units having a crosslinkable group is from 0.5 to 35 mol % to all units which the fluorinated polymer comprises, or a crosslinked fluorinated polymer formed by letting said polymer be crosslinked.

[7] The decorative film according to [6], wherein the glass transition temperature of the fluorinated polymer having crosslinkable groups is from 25 to 120° C.

[8] The decorative film according to [6] or [7], wherein the top layer either contains a fluorinated polymer having crosslinkable groups with a glass transition temperature of less than 50° C. and a fluorinated polymer having crosslinkable groups with a glass transition temperature of at least 50° C., or contains crosslinked fluorinated polymers formed by letting such fluorinated polymers having crosslinkable groups be crosslinked.

[9] The decorative film according to any one of [6] to [8], wherein the crosslinkable groups are hydroxy groups or carboxy groups.

[10] The decorative film according to any one of [6] to [9], wherein the number average molecular weight of the fluorinated polymer having crosslinkable groups is from 3,000 to 30,000.

[11] The decorative film according to any one of [1] to [10], wherein the top layer contains a crosslinked fluorinated polymer.

[12] The decorative film according to [11], wherein the crosslinked fluorinated polymer is a crosslinked fluorinated polymer formed by using a composition comprising a fluorinated polymer having crosslinkable groups, a curing agent and a solvent, wherein the composition is a composition containing solid contents in an amount of from 10 to 90 mass % to the total mass of the composition, and containing the fluorinated polymer in an amount of from 5 to 90 mass % to the total mass of the solid contents.

[13] The decorative film according to any one of [1] to [12], which further has a bonding layer.

[14] The decorative film according to any one of [1] to [13], which is used for decorating a three dimensional molded product to be used for an automobile exterior member or an automobile interior member.

[15] A method for producing a decorative film-attached three dimensional molded product, which comprises press-bonding under a reduced pressure the decorative film as defined in any one of [1] to [14] and the surface to be decorated of a three dimensional molded product, to obtain a decorative film-attached three dimensional molded product having the top layer on the outermost surface.

Advantageous Effects of Invention

According to the present invention, it is possible to provide a decorative film whereby formation of wrinkles is suppressed, when bonded to a three dimensional molded product while being stretched or in a stretched state, and a method for producing a decorative film-attached three dimensional molded product.

DESCRIPTION OF EMBODIMENTS

Meanings of the terms in the present invention are as follows.

In this specification, decorating is meant for e.g. imparting a design property or protection of a surface, and a decorative film is meant for a film to be used for decorating an object to be decorated.

A (meth)acrylate is a generic term for an acrylate and a methacrylate, and (meth)acrylic is a generic term for acrylic and methacrylic. Further, a (meth)acrylic resin is meant for a resin made of a polymer composed mainly of units based on a (meth)acrylate.

A unit is a generic term for an atomic group formed directly by polymerization of a monomer and based on one molecule of the monomer, and an atomic group obtained by chemically converting a portion of the atomic group. The contents (mol %) of the respective units to all units which a polymer comprises, are obtainable by analyzing the polymer by a nuclear magnetic resonance spectra (NMR) method.

The acid value and the hydroxy value are, respectively, values measured in accordance with the methods of JIS K0070-3 (1992).

The glass transition temperature is an intermediate point glass transition temperature of a polymer as measured by a differential scanning calorimetry (DSC) method. The glass transition temperature is referred to also as Tg.

The softening temperature is a value as measured in accordance with the method of JIS K7196 (1991).

The number average molecular weight and the weight average molecular weight are values as measured by gel permeation chromatography using polystyrene as a standard substance. The number average molecular weight is referred to also as Mn, and the weight average molecular weight is referred to also as Mw.

In a case where a composition or the like contains a solvent, the mass of solid content is a mass obtained by removing the solvent from the composition or the like. Here, with respect to components constituting the solid content of the composition other than the solvent, even if their nature is liquid, they shall be regarded as solid. The mass of solid content in a composition is obtainable as a mass remaining after heating 1 g of the composition at 130° C. for 20 minutes.

The total light transmittance is a value as measured by the D light source in accordance with JIS K7361-1: 1997.

Each of Wa, Wb, Wc, Wd and We is meant for the surface reflection intensity for each wavelength band as measured by using a wave scan apparatus (input reflection angle of 60 degrees).

Wa: the surface reflection intensity at a wavelength of from 0.1 to 0.3 mm

Wb: the surface reflection intensity at a wavelength of from 0.3 to 1.0 mm

Wc: the surface reflection intensity at a wavelength of from 1.0 to 3.0 mm

Wd: the surface reflection intensity at a wavelength of from 3.0 to 10.0 mm

We: the surface reflection intensity at a wavelength of from 10.0 to 30.0 mm

The wave scan apparatus is an apparatus which measures changes in intensity of reflected light at the time of moving the light receiving point of the laser beam irradiated to the sample surface, whereupon the amplitude of the measured wave is decomposed for each of the wavelength bands, to calculate for each wavelength band the value (surface reflection intensity) corresponding to the magnitude of the amplitude.

As a specific example of the wave scan apparatus, "Wave-Scan Dual" (product name of BYK-Gardner) may be mentioned.

The 60° specular gloss is a value measured by using a variable angle glossmeter, in accordance with the method of JIS K5600-4-7. In Examples, as the variable angle glossmeter, "UGV-6P" (input reflection angle of 60 degrees, product of Suga Test Instruments Co., Ltd.) was used.

The thicknesses of the respective layers are values measured by using an eddy current film thickness meter. In Examples, as the eddy current film thickness meter, "EDY-5000" (product of Sanko Electronic Laboratory Co., Ltd.) was used.

The thicknesses of the respective layers in a decorative film can be calculated from the ratios of the thicknesses of the respective layers obtainable by observing the cross section of the decorative film by a scanning electron microscope equipped with an energy dispersive X-ray analyzer, and the entire thickness of the decorative film.

The decorative film of the present invention (hereinafter referred to also as the present decorative film) has a base film and a top layer containing a fluorinated polymer, wherein the top layer is disposed on one surface, and Wa and Wb of the top layer as measured by using a wave scan apparatus, in such a state that the decorative film is stretched by 1.5 times, are both at most 30.0.

Here, in many cases, the decorative film is bonded to a three dimensional molded product in a stretched state or while being stretched, with a view to enhancing the adhesion to the three dimensional molded product, and in such a case, the stretching degree of the decorative film is about 1.5 times in many cases from the viewpoint of satisfying both the design property of the decorative film and adhesion between the decorative film and the three dimensional molded product.

The present inventors have found that Wa and Wb of the top layer at the time of stretching the decorative film are related to formation of wrinkles at the time of bonding the three dimensional molded product and the decorative film, and it is possible to suppress formation of wrinkles in the decorative film at the time of bonding it to the three dimensional molded product, if Wa and Wb are adjusted to be at most the predetermined value.

Here, among Wa to Wc, Wa and Wb are indices which may be used to judge the state of fine irregularities on the surface, and it is judged that as the values of Wa and Wb are smaller, fine irregularities on the surface are less. Therefore, it can be said that if Wa and Wb of the top layer at the time of stretching the decorative film are large, fine irregularities are formed on the surface. Fine irregularities on the surface are considered to be formed when, by the stretching of the decorative film, the internal stress resulting in the top layer becomes unbalanced, and the internal stress formed in another layer will be exerted to the top layer. Thus, it is presumed that at the time of bonding the decorative film in a stretched state or in a process of being stretched to a three dimensional molded product, the top layer cannot completely relax the internal stress caused in the decorative film, and disturbance is caused in the direction of the force of the decorative film for shrinkage, whereby wrinkles will be formed.

In contrast, in the present decorative film, Wa and Wb of the top layer are smaller at the time of stretching. That is, it is considered that the internal stress of the top layer resulting from the stretching of the decorative film is in equilibrium in the layer, and that an internal stress formed in another layer can also be sufficiently relaxed in the top layer. Therefore, it is presumed that even in a case where the present decorative film is bonded to a three dimensional molded product in a stretched state or while being stretched, the disturbance is small in the direction of the force in which the present decorative film is to shrink, whereby it is possible to suppress formation of wrinkles.

First, the construction of the present decorative film will be described with reference to the drawings.

Figure 1:
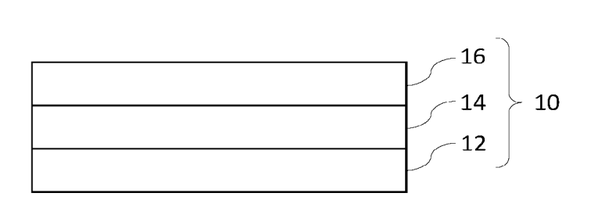
FIG. 1 is a schematic side view showing an example of the layer structure of the decorative film of the present invention.

FIG. 1 is a schematic side view showing the layer structure of a decorative film 10 which is an embodiment of the present invention. The decorative film 10 has a bonding layer 12, a base film 14 and a top layer 16, and the respective layers are arranged in this order.

By affixing the bonding layer 12 of the decorative film 10 and the surface to be decorated of a three dimensional molded product (as described below), a decorative film-attached three dimensional molded product is obtainable, in which the top layer 16, the base film 14, the bonding layer 12 and the three dimensional molded product are arranged in this order. Thus, the top layer 16 is positioned at the outermost surface of the decorative film-attached three dimensional molded product.

Although not shown in FIG. 1, in order to improve the design property, etc. of the present decorative film, the present decorative film may have a design layer which will be described later. The design layer is preferably arranged between the bonding layer and the top layer.

Specifically, in a case where the decorative film 10 in FIG. 1 has a design layer, an embodiment wherein the bonding layer 12, the design layer, the base film 14 and the top layer 16, are arranged in this order, and an embodiment wherein the bonding layer 12, the base film 14, the design layer and the top layer 16, are arranged in this order, may be mentioned.

Otherwise, the bonding layer, the base film or the top layer may serve also as a design layer, and in such as case, a design layer may not be provided.

Further, in the example of FIG. 1, a case where the decorative film 10 has a bonding layer 12 is exemplified for the description, but the present decorative film is not limited thereto and may have no bonding layer so long as the present decorative film can be bonded to a three dimensional molded product. That is, the present decorative film may have a base film and a top layer.

From the viewpoint of adhesion to the three dimensional molded product, the present decorative film preferably has a bonding layer. The bonding layer is a layer to bond the present decorative film and the three dimensional molded product, and preferably contains a bonding resin. Specific examples of the bonding resin may, for example, be an adhesive resin, a fusible resin and a sticky resin. The bonding layer may, for example, be formed by using a composition containing a bonding resin or a component which becomes to be a bonding resin as reacted by heat, etc. In the following, the composition containing a component which becomes to be a bonding resin by heat, etc., will be referred to also as a composition (a).

As the bonding resin, a thermally fusible resin and a thermally crosslinkable resin are preferred.

In the case of a thermally fusible resin, a thermally softened resin can be cooled and solidified in a state of being in contact with the surface of a three dimensional molded product, and thus can be joined to the surface. In the case of a thermally crosslinkable resin, the resin can be thermally crosslinked in a state of being in contact with the surface of a three dimensional molded product, and thus can be joined to the surface.

Specific examples of the thermally fusible resin may be a partially crosslinked thermally fusible resin having a low softening temperature, and a thermoplastic resin may be mentioned. A bonding layer containing a thermally fusible resin can be formed by using a thermally fusible resin or a composition (a). For example, by using a composition (a) comprising a polyol and a polyisocyanate, it is possible to form a bonding layer containing a thermally fusible polyurethane resin.

The softening temperature of the thermally fusible resin is preferably from 20 to 100° C., particularly preferably from 25 to 90° C., from the viewpoint of blocking resistance and moldability of the present decorative film.

Mw of the thermally fusible resin is preferably from 5,000 to 150,000, particularly preferably from 6,000 to 130,000, from the viewpoint of its film forming property and adhesion.

As the thermally fusible resin, from the viewpoint of excellent adhesion to a three dimensional molded product, a thermally fusible, urethane resin, (meth)acrylic resin, olefin resin, vinyl chloride-vinyl acetate resin, butyral resin, etc. are preferred.

The bonding resin may be a thermally crosslinkable resin comprising a resin as the main agent and a curing agent. Such a thermally crosslinkable resin may be a thermally crosslinkable urethane resin comprising a solid polyol or solid hydroxy terminated polyurethane prepolymer, and a solid polyisocyanate or solid blocked polyisocyanate, or an epoxy resin comprising a solid polyepoxide and a solid epoxy resin curing agent.

The composition (a) may contain the above thermally crosslinkable resin, or may contain a component which becomes to be such a thermally crosslinkable resin.

The bonding layer may also have a function as a design layer which will be described later. In such a case, by incorporating a coloring agent in the bonding layer, it is possible to obtain the bonding layer having also a function as a design layer.

The bonding layer may contain a component other than as described above. Specific examples of the component other than as described above may be an ultraviolet absorber, a light stabilizer, a curing catalyst, an antioxidant, a surface modifier, a leveling agent, an anti-sagging agent, a thickener, a defoaming agent, and a conductive filler.

The thickness of the bonding layer is preferably from 0.001 to 0.1 mm, more preferably from 0.004 to 0.08 mm, particularly preferably from 0.01 to 0.06 mm, from the viewpoint of film forming property and adhesion.

Components which the composition (a) may contain, are the same as the above-mentioned components which the bonding layer may contain. The components which the bonding resin and the bonding layer may contain, may be dissolved or dispersed in the bonding layer forming agent by a solvent such as water or an organic solvent.

The base film will function as a support film to support the respective layers, at the time of producing a decorative film.

Specific examples of the material constituting the base film may be a vinyl chloride resin, a polyester resin, an ABS resin (acrylonitrile-butadiene-styrene copolymer), a (meth) acrylic resin, an olefin resin, and a fluorinated resin (preferably polyvinylidene fluoride). Among them, the material constituting the base film preferably contains at least one member selected from the group consisting of a vinyl chloride resin, a polyester resin, an ABS resin, a (meth) acrylic resin, and polyvinylidene fluoride.

The thickness of the base film is preferably from 0.01 to 0.5 mm, particularly preferably from 0.02 to 0.3 mm.

The base film may have an uneven pattern on at least one surface. The uneven pattern can be formed by a processing method such as embossing processing, hairline processing or chemical etching. If the base film has an uneven pattern, the uneven pattern will be imparted to a decorative film after peeling off the base film, and thus, a design property due to the uneven pattern can be imparted to the decorative film-attached three dimensional molded product.

The top layer in the present decorative film contains a fluorinated polymer and thus is excellent in antifouling properties, durable weather resistance and chemical resistance. Therefore, the decorative film-attached three dimensional molded product having such a top layer will also have the same effects.

The fluorinated polymer contained in the top layer may be a fluorinated polymer having a crosslinked structure, i.e. a crosslinked fluorinated polymer, or may be a fluorinated polymer having no crosslinked structure. Hereinafter, among the fluorinated polymers, a crosslinked fluorinated polymer will be referred to as a fluorinated polymer $F^1$, and a fluorinated polymer having no crosslinked structure will be referred to as a fluorinated polymer $F^0$.

The fluorinated polymer in the top layer in the present decorative film is preferably a fluorinated polymer $F^1$, from the viewpoint of durability of the top layer. The fluorinated polymer contained in the top layer may partially be a fluorinated polymer $F^0$ or may entirely be a fluorinated polymer $F^1$. Also the fluorinated polymer in the top layer of the decorative film in a decorative film-attached three dimensional molded product should likewise preferably be a fluorinated polymer $F^1$.

In any case, before being subjected to the production of a decorative film-attached three dimensional molded product, the top layer already forms a uniform coating film (layer). Therefore, it is possible to prevent volatilization of components in a layer other than the top layer at the time of bonding the present decorative film and the three dimensional molded product.

The top layer can be formed, for example, by using a composition containing a fluorinated polymer as described later.

Further, the top layer may also have a function as a design layer as described later. In such a case, by incorporating a coloring agent, etc. in the top layer, it is possible to obtain the top layer which also has a function as a design layer.

The fluorinated polymer $F^1$ is preferably a crosslinked fluorinated polymer obtainable by crosslinking a fluorinated polymer having no crosslinked structure. As the fluorinated polymer having no crosslinked structure, a fluorinated polymer $F^0$ having crosslinkable groups is preferred. In such a case, the fluorinated polymer $F^1$ may have unreacted crosslinkable groups.

The fluorinated polymer $F^0$ may be a fluorinated polymer having no crosslinkable groups.

Further, the top layer in the present decorative film may be a top layer comprising a fluorinated polymer $F^0$ having crosslinkable groups and a curing agent, etc. In the case of such a present decorative film, by carrying out heating, etc. at the time of press-bonding the present decorative film and a surface to be decorated of a three dimensional molded product, it is possible to convert the fluorinated polymer $F^0$ to the fluorinated polymer $F^1$, whereby it is possible to obtain the present decorative film-attached three dimensional molded product having a top layer containing the fluorinated polymer $F^1$.

The following embodiments may be mentioned as embodiments of the later described composition (s) for forming a top layer of the present decorative film, and the fluorinated polymer in a top layer in the present decorative film or in a top layer in the present decorative film-attached three dimensional molded product.

Embodiment 1: fluorinated polymer $F^0$-containing composition (s)→fluorinated polymer $F^0$-containing top layer (film)→fluorinated polymer $F^0$-containing top layer (molded product)

Embodiment 2: fluorinated polymer $F^0$-containing composition (s)→fluorinated polymer $F^1$-containing top layer (film)→fluorinated polymer $F^1$-containing top layer (molded product)

Embodiment 3: fluorinated polymer $F^0$-containing composition (s)→fluorinated polymer $F^0$-containing top layer (film)→fluorinated polymer $F^1$-containing top layer (molded product)

In the above embodiment 1, the fluorinated polymer $F^0$ may be a fluorinated polymer having no crosslinkable groups or may be a fluorinated polymer having crosslinkable groups. In the latter case, by using a composition (s) which does not contain a component to crosslink the fluorinated polymer having crosslinkable groups, such as a curing agent, etc., it is possible to form a top layer containing the fluorinated polymer $F^0$.

In the above embodiments 2 and 3, the fluorinated polymer $F^0$ is a fluorinated polymer $F^0$ having crosslinkable groups, and it is preferred to use a composition (s) containing a component such as a curing agent to crosslink the fluorinated polymer having crosslinkable groups. In the above embodiment 2, at the time of producing the present decorative film, the fluorinated polymer $F^0$ is converted to the fluorinated polymer $F^1$. In the above embodiment 3, at the time of producing the present decorative film-attached three dimensional molded product from the present decorative film (the top layer contains the fluoropolymer $F^0$), the fluorinated polymer $F^0$ is converted to the fluorinated polymer $F^1$.

As the present decorative film, the decorative film having a top layer in the above embodiment 2 is particularly preferred from the viewpoint of durability of the top layer and from the viewpoint of stability and durability during a period until obtaining the present decorative film-attached three dimensional molded product.

The fluorinated polymer $F^0$ contains units based on a monomer containing fluorine atoms.

The units based on a monomer containing fluorine atoms are preferably units based on a fluoroolefin (hereinafter referred to as units (F)).

A fluoroolefin is an olefin having at least one of hydrogen atoms substituted by a fluorine atom. In the fluoroolefin, at least one of hydrogen atoms not substituted by a fluorine atom may be substituted by a chlorine atom.

Specific examples of the fluoroolefin may be $CF_2=CF_2$, $CF_2=CFCl$, $CF_2=CHF$, $CH_2=CF_2$, $CF_2=CFCF_3$, $CF_2=CHCF_3$, $CF_3CH=CHF$, $CF_3CF=CH_2$, and $CH_2=CX^{f1}(CF_2)_{n1}Y^{f1}$ (wherein $X^{f1}$ and $Y^{f1}$ are each independently a hydrogen atom or a fluorine atom, and n1 is an integer of from 2 to 10). As the fluoroolefin, $CF_2=CF_2$, $CF_2=CFCl$, $CF_3CH=CHF$ and $CF_3CF=CH_2$ are preferred, and from the viewpoint of copolymerizability, $CF_2=CFCl$ is particularly preferred. As the fluoroolefin, two or more types may be used in combination.

The content of units (F) is preferably from 20 to 70 mol %, more preferably from 40 to 60 mol %, particularly preferably from 45 to 55 mol %, to all units which the fluorinated polymer comprises, from the viewpoint of weather resistance of the present decorative film.

The fluorinated polymer may contain units based on a monomer containing fluorine atoms, other than a fluoroolefin. As the monomer containing fluorine atoms other than a fluoroolefin, the following monomers may be mentioned.

A fluoro(alkyl vinyl ether) represented by e.g. a compound represented by the formula $CF_2=CFOR^{f21}$ (wherein $R^{f21}$ represents a $C_{1-10}$ fluoroalkyl group which may contain an etheric oxygen atom) (e.g. perfluoro(methyl vinyl ether), perfluoro(ethyl vinyl ether), perfluoro(propyl vinyl ether), perfluoro(butyl vinyl ether), etc.)

A compound represented by the formula $CF_2=CFOR^{f22}SO_2X^{f22}$ (wherein $R^{f22}$ represents a $C_{1-10}$ fluoroalkylene group which may have an etheric oxygen atom, and $X^{f22}$ represents a halogen atom or a hydroxy group)

A compound represented by the formula $CF_2=CFOR^{f23}CO_2X^{f23}$ (wherein $R^{f23}$ represents a $C_{1-10}$ fluoroalkylene group which may contain an etheric oxygen atom, and $X^{f23}$ represents a hydrogen atom or an alkyl group having at most 3 carbon atoms)

A compound represented by the formula $CF_2=CF(CF_2)_{n3}OCF=CF_2$ (wherein n3 represents 1 or 2) (e.g. $CF_2=CFOCF_2CF=CF_2$, $CF_2=CFO(CF_2)_2CF=CF_2$, etc.)

A compound having fluorine atoms and an aliphatic ring structure (for example, perfluoro(2,2-dimethyl-1,3-dioxole) (PDD), 2,2,4-trifluoro-5-trifluoromethoxy-1,3-dioxole, perfluoro(2-methylene-4-methyl-1,3-dioxolane), etc.)

As the monomer containing fluorine atoms other than a fluoroolefin, two or more types may be used in combination.

The fluorinated polymer $F^0$ preferably contains units based on a monomer containing fluorine atoms, and units based on a monomer containing no fluorine atom, from such a viewpoint that the effects of the present invention will be more excellent.

The units based on a monomer containing no fluorine atom may be units (hereinafter referred to also as units (1)) based on a monomer having no crosslinkable group (hereinafter referred to also as a monomer (1)) selected from the group consisting of a vinyl ether, a vinyl ester, an allyl ether, an allyl ester and a (meth)acrylic acid ester, units (hereinafter referred to also as units (2)) having a crosslinkable group, and units other than units (1) and units (2).

The fluorinated polymer is preferably a fluorinated polymer $F^0$ containing units (2) or a fluorinated polymer $F^1$ having such a fluorinated polymer $F^0$ crosslinked, from such a viewpoint that the effects of the present invention will be more excellent.

The fluorinated polymer $F^0$ preferably contains units (F), units (1) and units (2), and more preferably consists of units (F), units (1) and units (2).

Units (1) are units based on a monomer (a monomer (1)) having no crosslinkable group, selected from the group consisting of a vinyl ether, a vinyl ester, an allyl ether, an allyl ester and a (meth)acrylic acid ester, preferably units based on a monomer having no crosslinkable group, selected from the group consisting of a vinyl ether, a vinyl ester and an allyl ether.

Units (1) are preferably units based on a monomer represented by the formula $X^1-Y^1$.

$X^1$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and from the viewpoint of excellent weather resistance of the present decorative film, $CH_2=CHOC(O)-$, $CH_2=CHO-$ or $CH_2=CHCH_2O-$ is preferred.

$Y^1$ is a $C_{1-24}$ monovalent hydrocarbon group. The monovalent hydrocarbon group may be linear or branched. Further, the monovalent hydrocarbon group may be made from a ring structure, or it may contain a ring structure. Further, the monovalent hydrocarbon group may be a monovalent saturated hydrocarbon group or a monovalent unsaturated hydrocarbon group.

As the monovalent hydrocarbon group, an alkyl group, a cycloalkyl group, an aryl group, an aralkyl group and a cycloalkylalkyl group are preferred, and a $C_{2-12}$ alkyl group, a $C_{6-10}$ cycloalkyl group, a $C_{6-10}$ aryl group, a $C_{7-12}$ aralkyl group and a $C_{6-10}$ cycloalkylalkyl group are particularly preferred.

Specific examples of the alkyl group may be a methyl group, an ethyl group, a tert-butyl group, a hexyl group, a nonyl group, a decyl group and a dodecyl group.

A specific example of the cycloalkyl group may be a cyclohexyl group.

A specific example of the aralkyl group may be a benzyl group.

A specific example of the cycloalkylalkyl group may be a cyclohexylmethyl group.

Specific examples of the aryl group may be a phenyl group and a naphthyl group.

Here, a cycloalkyl portion of the cycloalkyl group or the cycloalkylalkyl group, or a hydrogen atom of the aryl group or the aralkyl group, may be substituted by an alkyl group. In such a case, the number of carbon atoms in the alkyl group as a substituent shall not be included in the number of carbon atoms in the cycloalkyl group, the aryl group or the aralkyl group.

As the monomer (1), two or more types may be used in combination.

Specific examples of the monomer (1) may be ethyl vinyl ether, tert-butyl vinyl ether, 2-ethylhexyl vinyl ether, cyclohexyl vinyl ether, vinyl acetate, vinyl pivalate ester, vinyl neononanoate ester (trade name of HEXION: "VeoVa 9"), vinyl neodecanoate ester (trade name of HEXION: "VeoVa 10"), vinyl benzoate, tert-butyl benzoate vinyl ester, tert-butyl (meth)acrylate and benzyl (meth)acrylate.

The content of units (1) is preferably from 5 to 60 mol %, particularly preferably from 10 to 50 mol %, to all units which the fluorinated polymer comprises.

Specific examples of the crosslinkable group which units (2) have, may be a hydroxy group, a carboxy group, an amino group, an alkoxysilyl group, an epoxy group, and an oxetanyl group, and from such a viewpoint that the abrasion resistance of the top layer will be more improved, a hydroxy group and a carboxy group are preferred, and a hydroxy group is particularly preferred.

Units (2) may be units based on a monomer having a crosslinkable group (hereinafter referred to also as a monomer (2)) or may be units obtainable by converting crosslinkable groups in a fluorinated polymer containing units (2) to different crosslinkable groups. Such units may be units obtainable by reacting a polycarboxylic acid or its acid anhydride (5-norbornene-2,3-dicarboxylic anhydride, citraconic anhydride, maleic anhydride, itaconic anhydride, himic anhydride, etc.) to a fluorinated polymer containing units having hydroxy groups, to convert some or all of the hydroxy groups to carboxy groups.

As the monomer (2) wherein the crosslinkable group is a carboxy group, an unsaturated carboxylic acid, (meth) acrylic acid, etc. may be mentioned, and a monomer represented by the formula $X^{21}$—$Y^{21}$ (hereinafter referred to also as a monomer (21)) is preferred.

$X^{21}$ is $CH_2=CH-$, $CH(CH_3)=CH-$ or $CH_2=C(CH_3)-$ and is preferably $CH_2=CH-$ or $CH(CH_3)=CH-$.

$Y^{21}$ is a carboxy group, or a $C_{1-12}$ monovalent saturated hydrocarbon group having a carboxy group, and is preferably a carboxy group, or a $C_{1-10}$ carboxyalkyl group.

Specific examples of the monomer (21) may be $CH_2=CHCOOH$, $CH(CH_3)=CHCOOH$, $CH_2=C(CH_3)COOH$, and a compound represented by the formula $CH_2=CH(CH_2)_{n2}COOH$ (wherein n2 is an integer of from 1 to 10).

As the monomer (2) wherein the crosslinkable group is a hydroxy group, allyl alcohol, and a vinyl ether, a vinyl ester, an allyl ether, an allyl ester and a (meth)acrylic acid ester, having a hydroxy group, may be mentioned, and allyl alcohol or a monomer represented by the formula $X^{22}$—$Y^{22}$ (hereinafter referred to also as a monomer (22)) is preferred.

$X^{22}$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and is preferably $CH_2=CHO-$ or $CH_2=CHCH_2O-$.

$Y^{22}$ is a $C_{2-42}$ monovalent organic group having a hydroxy group. The organic group may be linear or branched. Further, the organic group may be made of a ring structure, or it may contain a ring structure.

As the organic group, a $C_{2-6}$ alkyl group having a hydroxy group, an alkyl group containing a $C_{6-8}$ cycloalkylene group having a hydroxy group, and a polyoxyalkylene group having a hydroxy group, are preferred.

Specific examples of the monomer (22) may be $CH_2=CHO-CH_2$-cyclo$C_6H_{10}$-$CH_2OH$,
$CH_2=CHCH_2O-CH_2$-cyclo$C_6H_{10}$-$CH_2OH$,
$CH_2=CHOCH_2CH_2OH$, $CH_2=CHCH_2OCH_2CH_2OH$,
$CH_2=CHOCH_2CH_2CH_2CH_2OH$,
$CH_2=CHCH_2OCH_2CH_2CH_2CH_2OH$, and
$CH_2=CHOCH_2$-cyclo$C_6H_{10}$-$CH_2O(CH_2CH_2O)_{15}H$.

Here, -cyclo$C_6H_{10}$- represents cyclohexylene, and binding sites of (-cyclo$C_6H_{10}$-) are usually 1,4-.

As the monomer (2), two or more types may be used in combination.

Further, units (2) may have two or more types of crosslinkable groups.

In a case where the top layer contains a fluorinated polymer $F^1$, the entirety of a fluorinated polymer $F^0$ may have converted to the fluorinated polymer $F^1$, or a part thereof may remain as a fluorinated polymer $F^0$. The fluorinated polymer $F^1$ is preferably a crosslinked fluorinated polymer formed by being crosslinked by reacting with another component such as a curing agent as described later.

In a case where the top layer contains a fluorinated polymer $F^1$, as crosslinkable groups in units (2) in a fluorinated polymer $F^0$ have become to be crosslinking points, crosslinking of the fluorinated polymer to one another or to other components, etc. has been conducted via a curing agent. Thus, hardness and flexibility of the top layer are improved, and its coating film properties such as weather resistance, water resistance, chemical resistance, heat resistance, stretchability, etc., are improved.

The content of units (2) is preferably from 0.5 to 35 mol %, more preferably from 3 to 25 mol %, particularly preferably from 5 to 25 mol %, most preferably from 5 to 20 mol %, to all units which the fluorinated polymer $F^0$ comprises.

The fluorinated polymer $F^0$ preferably contains units (F), units (1) and units (2), in amounts of from 20 to 70 mol %, from 5 to 60 mol % and from 0.5 to 35 mol %, in this order, to all units which the fluorinated polymer has.

Units other than units (1) and units (2), which contain no fluorine atom, may be units based on ethylene, propylene, 1-butene, etc. As such units, two or more types may be used in combination.

Tg of the fluorinated polymer $F^0$ is preferably from 25 to 120° C., more preferably from 30 to 100° C., particularly preferably from 40 to 60° C., from such a viewpoint that the present decorative film will be excellent in stretchability, abrasion resistance, chemical resistance and hardness.

Mn of the fluorinated polymer $F^0$ is preferably from 3,000 to 30,000, more preferably from 5,000 to 25,000, particularly preferably from 7,000 to 20,000, from the viewpoint of followability of the top layer. Here, in a case where the fluorinated polymer $F^1$ in the fluorinated layer is formed of two or more types of fluorinated polymer $F^0$, Mn of the fluorinated polymer $F^0$ means the weighted average value having Mn of the respective fluorinated polymers $F^0$ weighted by the contents of the respective fluorinated polymers.

In a case where the fluorinated polymer $F^0$ has carboxy groups, its acid value is preferably from 1 to 150 mgKOH/g, more preferably from 3 to 100 mgKOH/g, particularly preferably from 5 to 50 mgKOH/g, from the viewpoint of the impact resistance, flexibility and chemical resistance of the present decorative film.

In a case where the fluorinated polymer $F^0$ has hydroxy groups, its hydroxy value is preferably from 1 to 150 mgKOH/g, more preferably from 3 to 100 mgKOH/g, particularly preferably from 10 to 60 mgKOH/g, from the viewpoint of the impact resistance, flexibility and chemical resistance of the present decorative film.

The fluorinated polymer $F^0$ may have only either one of the acid value and the hydroxy value, or may have both.

When the acid value and the hydroxy value are within the above ranges, it is possible to properly adjust Tg of the fluorinated polymer $F^0$, and the physical properties of the present decorative film (impact resistance, flexibility, chemical resistance, etc.) become to be good.

The top layer more preferably contains two or more fluorinated polymers. The two or more fluorinated polymers are preferably fluorinated polymers $F^0$ different in Tg from one another, or fluorinated polymers $F^1$ obtained by crosslinking of such fluorinated polymers $F^0$ different in Tg from one another.

The two or more fluorinated polymers are preferably a combination of a fluorinated polymer $F^0$ with Tg of less than 50° C. and a fluorinated polymer $F^0$ with Tg of at least 50° C., within the range of above-mentioned preferred Tg of the fluorinated polymer $F^0$.

When a fluorinated polymer $F^0$ with preferred Tg of less than 50° C. is used, while stretchability and abrasion resistance of the present decorative film will be excellent, there is a case where chemical resistance and hardness of the present decorative film are not sufficient. Also when a fluorinated polymer $F^0$ with Tg of at least 50° C. is used, while chemical resistance and hardness of the present decorative film will be excellent, there is a case where stretchability and abrasion resistance of the present decorative film are not sufficient. Thus, in the present decorative film, the stretchability and abrasion resistance, and the chemical resistance and hardness, are in a trade-off relationship. Therefore, by using two or more fluorinated polymers $F^0$ different in Tg, it is considered possible to provide the stretchability and abrasion resistance, and the chemical resistance and hardness, of the decorative film, in a balanced state.

In particular, it is considered that when the stretchability and the hardness of the decorative film are balanced, uniformity in elongation at the time of stretching the present decorative film will be good, whereby it is possible to further suppress formation of wrinkles at the time of bonding the present decorative film to a three dimensional molded product in a stretched state or while being stretched.

From the viewpoint of the above-described balance of physical properties, the mass ratio of the fluorinated polymer $F^0$ with Tg of less than 50° C. to the fluorinated polymer $F^0$ with Tg of at least 50° C. (fluorinated polymer $F^0$ with Tg of less than 50° C./fluorinated polymer $F^0$ with Tg of at least 50) is preferably from 0.1 to 9, more preferably from 1 to 9, particularly preferably from 2 to 4.

Further, the absolute value of the difference in Tg between the fluorinated polymer $F^0$ with Tg of at least 50° C. and the fluorinated polymer $F^0$ with Tg of less than 50° C., is preferably from 5 to 20° C., particularly preferably from 10 to 15° C.

The content of the fluorinated polymer in the top layer is preferably from 30 to 100 mass %, particularly preferably from 50 to 95 mass %, to the total mass of the top layer, from the viewpoint of weather resistance of the present decorative film.

From such a viewpoint that it becomes easy to adjust Wa to We of the top layer to be within the predetermined ranges to be described later, the top layer preferably contains a non-fluorinated compound having an aliphatic polyether chain, a non-fluorinated compound having an aliphatic polyester chain, a non-fluorinated compound having an aliphatic polyether ester, or a non-fluorinated compound having an aliphatic polycarbonate chain, or contains a crosslinked product having such a non-fluorinated compound having crosslinkable groups crosslinked. The crosslinkable groups are preferably hydroxy groups and carboxy groups, in the same manner as in the fluorinated polymer $F^0$. The non-fluorinated compound having crosslinkable groups becomes a crosslinked product by a curing agent, etc., and at that time, may be co-crosslinked with a fluorinated polymer $F^0$ having crosslinkable groups. Further, an aliphatic polyether chain, an aliphatic polyester chain or the like may be a chain having a branch. Further, the number of crosslinkable groups in the above non-fluorinated compound is preferably at most 6, more preferably from 2 to 4.

The non-fluorinated compound having an aliphatic polyether chain may be a polyoxyalkylene polyol, a polyoxyalkylene monool, or an alkyl etherified product thereof. The non-fluorinated compound having an aliphatic polyester chain may be a polyester diol or polyester dicarboxylic acid composed of an aliphatic dicarboxylic acid residue and aliphatic diol residue, or a polyester diol or polyester dicarboxylic acid comprised of an aliphatic hydroxycarboxylic acid residue. The non-fluorinated compound having an aliphatic polyetherester chain may be a polyether ester diol having an aliphatic polyether diol residue and aliphatic dicarboxylic acid residue. The non-fluorinated compound having an aliphatic polyether chain may be a polyalkylene carbonate diol having an aliphatic diol residue and carbonyl group.

The non-fluorinated compound having a branched chain may, for example, be a trivalent or higher valent polyoxyalkylene polyol obtainable by adding an alkylene oxide to a trivalent or higher valent alcohol, or a trivalent or higher valent polyester polyol or polyester polycarboxylic acid, having a trivalent or higher valent aliphatic polycarboxylic acid residue or trivalent or higher valent aliphatic polyol residue, and an aliphatic dicarboxylic acid residue and aliphatic diol residue.

As the non-fluorinated compound, from the viewpoint of excellent stretchability of the present decorative film, a divalent to tetravalent polyoxyalkylene polyol, an aliphatic polyester diol and an aliphatic polycarbonate diol are more preferred, and a polyoxyalkylene triol is particularly preferred.

The above non-fluorinated compound is preferably a compound represented by the formula: $A\text{-}[(X)_t(Y)_m\text{—}Z]_n$ (hereinafter referred to also as a compound (1)), from such a viewpoint that the above functions can better be exhibited.

Here, in a case where a terminal group of the compound (1) is a hydroxy group or a carboxy group, the compound (1) one another, or the compound (1) and a fluorinated polymer, may be crosslinked by a curing agent, etc. as described later. That is, the top layer may have a crosslinked structure of the compound (1) one another via a curing agent, etc. or a crosslinked structure between the compound (1) and a fluorinated polymer. In such a case, stretchability of the top layer will be more excellent.

A represents an n-valent group obtained by removing, from an alcohol having n hydroxy groups, hydrogen atoms of the hydroxy groups.

n is an integer of from 1 to 12, preferably an integer of from 2 to 12, more preferably an integer of from 2 to 10, further preferably an integer of from 2 to 6, particularly preferably from 2 to 4.

The alcohol having n hydroxy groups may be an alcohol having one hydroxy group, or an alcohol having two or more hydroxy groups (hereinafter referred to also as a polyhydric alcohol).

The alcohol having one hydroxy group is preferably a $C_{1-14}$ alcohol, and specific examples thereof include methanol, ethanol, 1-propanol, 2-propanol, 1-butanol, 2-butanol, tert-butyl alcohol, 1-pentanol, 1-hexanol, 1-octanol, isooctyl alcohol, 2-ethylhexanol, 1-nonanol, 2,6-dimethyl-4-heptanol, 1-decanol, 1-undecanol, 1-dodecanol, 1-tridecanol and 1-tetradecanol.

Specific examples of the polyhydric alcohol may be a dihydric alcohol (ethylene glycol, diethylene glycol, propylene glycol, dipropylene glycol, 1,3-propanediol, 1,3-butanediol, 1,4-butanediol, 2,3-butanediol, 1,5-pentanediol, 3-methyl-1,5-pentanediol, 1,6-hexanediol, 1,4-cyclohexanediol, etc.), and a trihydric or higher polyhydric alcohol (glycerin, diglycerin, trimethylolpropane, ditrimethylolpropane, pentaerythritol, dipentaerythritol, tripentaerythritol, etc.).

l+m in at least one $[(X)_l(Y)_m—Z]$ among n number of $[(X)_l(Y)_m—Z]$, is an integer of at least 1.

Here, in a case where n is 2 or more, in at least one of $[(X)_l(Y)_m—Z]$, l+m may be 0, and Z may be a hydrogen atom. That is, in a case where n is 2 or more, at least one of $[(X)_l(Y)_m—Z]$ may be a hydrogen atom, and in such a case, the compound (1) has a hydroxy group as a part of the residue of a polyhydric alcohol.

X is a divalent group represented by $—(C_pH_{2p}O)—$, $—(CO—C_qH_{2q}O)—$, $—[CO—C_qH_{2q}COO—(C_pH_{2p}O)_r]—$ or $—(COO—C_sH_{2s}—O)—$, and from the viewpoint of excellent stretchability of the present decorative film, a divalent group represented by $—(C_pH_{2p}O)—$ is preferred.

$—(X)_l—$ represents a polyoxyalkylene chain represented by $—(C_pH_{2p}O)_l—$, a polyester chain represented by $—(CO—C_qH_{2q}O)_l—$, a polyester chain represented by $—[CO—C_qH_{2q}COO—(C_pH_{2p}O)_r]_l—$, or a polycarbonate chain represented by $—(COO—C_sH_{2s}—O)_l—$. However, in a case where l is 2 or more, $—(X)_l—$ may be a chain having two or more types among the divalent groups represented by $—(C_pH_{2p}O)—$, $—(CO—C_qH_{2q}O)—$, $—(CO—C_qH_{2q}COO—C_pH_{2p}O)—$ and $—(COO—C_sH_{2s}—O)—$.

Here, of $—(C_pH_{2p}O)_l—$, the bond of the terminal carbon atom is bonded to the A side, and the bond of the terminal oxygen atom is bonded to the Y side. Similarly, of $—(CO—C_qH_{2q}O)_l—$, the bond of the terminal carbonyl group is bonded to the A side, and the bond of the terminal oxygen atom is bonded to the Y side. Similarly, of $—[CO—C_qH_{2q}COO—(C_pH_{2p}O)_r]_l—$, the bond of the terminal carbonyl group is bonded to the A side, and the bond of the terminal oxygen atom is bonded to the Y side. Similarly, of $—(COO—C_sH_{2s}—O)_l—$, the bond of the terminal carbonyl group is bonded to the A side, and the bond of the terminal oxygen atom is bonded to the Y side.

l is an integer of from 0 to 100, and in a case where n is 2 or more, the respective l in the two or more $[(X)_l(Y)_m—Z]$ may be the same or different from one another. In a case where n is 2 or more, each of l is 1 or more. From the viewpoint of the advantageous effects of the present invention, each of l is preferably from 2 to 75, more preferably from 20 to 70.

In a case where n is 2 or more, the two or more $—(X)_l—$ may be the same or different from one another. For example, when $—(X)_l—$ is $—(C_pH_{2p}O)_l—$, in some cases, l in the respective $—(X)_l—$ are different from one another. Further, for example, when $—(X)_l—$ is $—(C_pH_{2p}O)_l—$, in some cases, p in the respective $—(X)_l—$ are different from one another.

In a case where X is $—(C_pH_{2p}O)—$, i.e. an oxyalkylene group, X is a $C_{2-4}$ oxyalkylene group (i.e. p is an integer of from 2 to 4). As the oxyalkylene group, an oxyethylene group, an oxypropylene group, an oxy-1,2-butylene group, an oxy-2,3-butylene group, and an oxytetramethylene group are preferred; an oxyethylene group and an oxypropylene group are more preferred, and an oxypropylene group is particularly preferred (i.e. p is particularly preferably an integer of 2 or 3).

In a case where $—(X)_l—$ has two or more oxyalkylene groups, the sequence of different oxyalkylene groups may be in a random form or in a block form, or may have both of a random form portion and a block form portion.

In a case where X is a group represented by $—(CO—C_qH_{2q}O)—$, X is a group formed by ring-opening of a lactone, or a group formed from a hydroxycarboxylic acid.

q is an integer of from 2 to 8, preferably an integer of from 3 to 6.

Further, with respect to a chain containing two or more types of $(CO—C_qH_{2q}O)$ different in q, it is possible to adjust the numerical value for q and to adjust the proportion of $(CO—C_qH_{2q}O)$ different in q. The sequence of two or more types of $(CO—C_qH_{2q}O)$ different in q may be in a random form or in a block form.

In a case where X is a group represented by $—[CO—C_qH_{2q}COO—(C_pH_{2p}O)_r]_l$, X is a group which is formed by polycondensation of a polycarboxylic acid and a polyhydric alcohol.

q is an integer of from 2 to 8, preferably an integer of from 3 to 6. p is, as described above, an integer of from 2 to 4, preferably an integer of 2 or 3. r is an integer of 1 or more, preferably an integer of from 1 to 100.

Specific examples of the polyhydric alcohol to constitute X are as described above. Further, as the polyhydric alcohol, a polyalkylene glycol such as polyethylene glycol or polypropylene glycol may also be used.

Specific examples of the polycarboxylic acid to constitute X are preferably dicarboxylic acids, and succinic acid, glutaric acid, adipic acid, pimelic acid, suberic acid, azelaic acid, and sebacic acid, may be mentioned, and adipic acid is preferred.

Further, with respect to a polyester chain containing two or more types of $—[CO—C_qH_{2q}COO—(C_pH_{2p}O)_r]—$ different in at least one of p, q and r, it is also possible to adjust the numerical values for p, q and r, or to adjust the proportions of $—[CO—C_qH_{2q}COO—(C_pH_{2p}O)_r]—$ different in at least one of p, q and r. The sequence of the two or more types of $—[CO—C_qH_{2q}COO—(C_pH_{2p}O)_r]—$ different in at least one of p, q and r, may be in a random form or in a block form.

In a case where X is a group represented by $—(COO—C_sH_{2s}—O)—$, X is a group formed by reacting phosgene or at least one of a dialkyl carbonate and a diphenyl carbonate, with a polyhydric alcohol, by using a phosgene method, or a carbonate interchange reaction using at least one of the dialkyl carbonate and the diphenyl carbonate.

s is an integer of from 2 to 8, preferably an integer of from 3 to 6.

Specific examples of the polyhydric alcohol to constitute X are as described above.

Further, $—(X)_l—$ may be a chain containing two or more types selected from the group consisting of $—(C_pH_{2p}O)—$, $—(CO—C_qH_{2q}O)—$, $—[CO—C_qH_{2q}COO—(C_pH_{2p}O)_r]—$ and $—(COO—C_sH_{2s}—O)—$. In such a case, the sequence of $—(C_pH_{2p}O)—$, $—(CO—C_qH_{2q}O)—$, $—[CO—C_qH_{2q}COO—(C_pH_{2p}O)_r]—$ and $—(COO—C_sH_{2s}—O)—$ may be in a random form or in a block form.

Y is a group represented by $—(CO—C_qH_{2q}—COO)—$. Y is a group formed by a polycarboxylic acid, and specific examples of the polycarboxylic acid are as described above.

q is, as described above, an integer of from 2 to 8, preferably an integer of from 3 to 6.

m is an integer of 0 or 1.

Z is a hydrogen atom or an alkyl group, preferably a hydrogen atom.

In a case where Z is an alkyl group, the number of carbon atoms is preferably from 1 to 5, more preferably from 1 to 3.

In a case where n is 2 or more, the two or more Z may be the same or different from one another; it is preferred that at least some are hydrogen atoms; and it is more preferred that all are hydrogen atoms. That is, the compound (1) is preferably a compound having at least one hydroxy group, and more preferably a compound having n hydroxy groups.

It is particularly preferred that n is at least 3, and three among at least three Z are hydrogen atoms (i.e. a case where the compound (1) has three hydroxy groups), whereby stretchability of the top layer and uniformity in elongation will be more excellent, and formation of wrinkles at the time of stretching of the present decorative film will be further suppressed.

As the compound (1), it is preferred that in the formula A-[(X)$_l$(Y)$_m$—Z]$_n$, X is at least one type selected from a divalent group represented by —(C$_p$H$_{2p}$O)— and a divalent group represented by —(CO—C$_q$H$_{2q}$O)—, Z is a hydrogen atom, l is an integer of from 1 to 100, m is 0, and n is an integer of from 2 to 12. When the compound (1) is in this embodiment, stretchability of the decorative film will be more excellent.

As the compound (1), it is further preferred that in A-[(X)$_l$(Y)$_m$—Z]$_n$, X is a divalent group represented by —(C$_p$H$_{2p}$O)—, Z is a hydrogen atom, l is an integer of from 1 to 100, m is 0, and n is an integer of from 2 to 6. When the compound (1) is in this embodiment, the decorative film will be excellent in stretchability and will be more excellent in abrasion resistance.

Specific examples of the compound (1) may be Sannix GP-250, Sannix GP-400, Sannix GP-600, Sannix GP-700, Sannix GP-1000, Sannix GP-1500, Sannix GP-3000, Sannix GP-3000V, Sannix GP-3030, Sannix GP-3700M, Sannix GP-4000 (each being a trade name of Sanyo Chemical Industries, Ltd.), Polycizer W-230-H, Polycizer W-1410-EL (each being a trade name of DIC Corporation), and Duranol T4692 (trade name of Asahi Kasei Corporation).

Mn of the compound (1) is preferably from 200 to 30,000, more preferably from 500 to 30,000, further preferably from 500 to 25,000, particularly preferably from 1,500 to 20,000, from such a viewpoint that it becomes easy to adjust Wa to We of the top layer to be within the predetermined ranges as will be described later.

The compound (1) preferably has the same cross-linkable groups as the fluorinated polymer F$^0$ has. The types of crosslinkable groups are as described above, and hydroxy groups are preferred. When the compound (1) has hydroxy groups, the hydroxy value of the compound (1) is preferably from 10 to 150 mgKOH/g, more preferably from 20 to 130 mgKOH/g, particularly preferably from 30 to 70 mgKOH/g, from the viewpoint of stretchability and abrasion resistance of the present decorative film.

It is particularly preferred that the top layer contains the fluorinated polymer F$^0$ and the compound (1), or a fluorinated polymer F$^1$ as a cured product formed as they have been crosslinked by a curing agent, etc., wherein each of the fluorinated polymer F$^0$ and the compound (1) has hydroxy groups, and the hydroxy value of the fluorinated polymer F$^0$ and the hydroxy value of the compound (1) are each preferably from 10 to 150 mgKOH/g. Thus, it becomes easy to adjust Wa to We to be within the predetermined ranges as will be described later, whereby formation of wrinkles at the time of stretching of the present decorative film will be further suppressed.

In a case where the top layer contains the compound (1) or a cured product formed as the compound (1) has been crosslinked by a curing agent, etc., the content of the compound (1) or a cured product thereof is preferably from 0.1 to 90 parts by mass, more preferably from 0.5 to 30 parts by mass, further preferably from 1 to 25 parts by mass, particularly preferably from 3 to 20 parts by mass, to 100 parts by mass of the fluorinated polymer F$^0$.

From such a viewpoint that stretchability of the present decorative film will be more excellent, the top layer preferably contains a crosslinked structure selected from between the fluorinated polymers F$^0$, between the fluorinated polymer F$^0$ and the compound (1), and between the compounds (1). The crosslinked structure may be a crosslinked structure formed by a curing agent, etc., or may be a crosslinked structure which is directly formed by electron beam crosslinking, etc. As the crosslinked structure, a crosslinked structure formed by a curing agent is preferred. In such a case, at least one type of the fluorinated polymer F$^0$ and the compound (1) has crosslinkable groups, and will react with a curing agent at the crosslinkable groups being crosslinking points, to form the crosslinked structure.

The curing agent is a compound having two or more groups reactive with crosslinkable groups, in a molecule. The curing agent and crosslinkable groups which the fluorinated polymer F$^0$ has, will react to form a crosslinked structure, whereby the fluorinated polymer F$^0$ will be cured. Further, in a case where the top layer is formed of a composition containing a fluorinated polymer F$^0$, and the composition contains a compound (1), the fluorinated polymer F$^0$, the compound (1) and a curing agent will be cured in a crosslinked state, whereby the present decorative film will be more excellent in stretchability. The curing agent usually has from 2 to 30 groups reactive with crosslinkable groups.

In a case where the fluorinated polymer F$^0$ has hydroxy groups, the curing agent is preferably a compound having two or more isocyanate groups or blocked isocyanate groups, in one molecule.

In a case where the fluorinated polymer F$^0$ has carboxy groups, the curing agent is preferably a compound having two or more epoxy groups, carbodiimide groups, oxazoline groups or β-hydroxyalkylamide groups, in one molecule.

In a case where the fluorinated polymer F$^0$ has both hydroxy groups and carboxy groups, either one of a compound having two or more isocyanate groups or blocked isocyanate groups in one molecule, and a compound having two or more epoxy groups, carbodiimide groups, oxazoline groups or β-hydroxyalkylamide groups in one molecule, may be used, or both of them may be used in combination.

As the compound having two or more isocyanate groups in one molecule, a polyisocyanate monomer or a polyisocyanate derivative is preferred.

The polyisocyanate monomer is preferably an alicyclic polyisocyanate, an aliphatic polyisocyanate or an aromatic polyisocyanate. The polyisocyanate derivative is preferably a multimer or modified product (biuret, isocyanurate, or adduct) of such a polyisocyanate monomer.

Specific examples of the aliphatic polyisocyanate may be aliphatic diisocyanates such as tetramethylene diisocyanate, pentamethylene diisocyanate, hexamethylene diisocyanate, 2,2,4-trimethyl-1,6-diisocyanatohexane and lysine diisocyanate, lysine triisocyanate, 4-isocyanatomethyl-1,8-octamethylene diisocyanate, and bis(2-isocyanatoethyl) 2-isocyanatoglutarate.

Specific examples of the alicyclic polyisocyanate may be alicyclic diisocyanates such as isophorone diisocyanate, 1,3-bis(isocyanatomethyl)-cyclohexane, 4,4'-dicyclohexylmethane diisocyanate, norbornene diisocyanate and hydrogenated xylylene diisocyanate, etc.

Specific examples of the aromatic polyisocyanate may be aromatic diisocyanates such as xylylene diisocyanate, etc.

From the viewpoint of stretchability of the present decorative film, the curing agent is preferably a modified product of a polyisocyanate monomer, more preferably an adduct or allophanate body of a polyisocyanate monomer, particularly preferably an adduct of hexamethylene diisocyanate.

The compound having two or more blocked isocyanate groups in one molecule is preferably a compound in which two or more isocyanate groups of the polyisocyanate monomer or polyisocyanate derivative as described above are blocked by a blocking agent.

The blocking agent is a compound having an active hydrogen, and specific examples may be an alcohol, a phenol, an active methylene, an amine, an imine, an acid amide, a lactam, an oxime, a pyrazole, an imidazole, an imidazoline, a pyrimidine, guanidine, etc.

Specific examples of the compound having two or more epoxy groups in one molecule may be a bisphenol type epoxy compound (A-type, F-type, S-type, etc.), a diphenyl ether type epoxy compound, a hydroquinone type epoxy compound, a naphthalene type epoxy compound, a biphenyl type epoxy compound, a fluorene type epoxy compound, a hydrogenated bisphenol A type epoxy compound, a bisphenol A-containing polyol type epoxy compound, a polypropylene glycol type epoxy compound, a glycidyl ester type epoxy compound, a glycidyl amine type epoxy compound, a glyoxal type epoxy compound, an alicyclic type epoxy compound, an alicyclic polyfunctional epoxy compound, and a heterocyclic epoxy compound (triglycidyl isocyanurate, etc.).

Specific examples of the compound having two or more carbodiimide groups in one molecule may be an alicyclic carbodiimide, an aliphatic carbodiimide, and an aromatic carbodiimide, as well as multimers and modified products thereof.

Specific examples of the compound having two or more oxazoline groups in one molecule may be an addition polymerizable oxazoline having a 2-oxazoline group, and a polymer of the addition-polymerizable oxazoline.

Specific examples of the compound having two or more β-hydroxyalkylamide groups in one molecule may be N,N,N',N'-tetrakis-(2-hydroxyethyl)-adipamide (Prim id XL-552, manufactured by EMS) and N,N,N',N'-tetrakis-(2-hydroxypropyl)-adipamide (Prim id QM 1260, manufactured by EMS).

The top layer may contain a curing catalyst. The curing catalyst is a compound that promotes a curing reaction at the time of using a curing agent, and may be selected from known curing catalysts, depending on the type of the curing agent.

The top layer preferably contains at least one type selected from the group consisting of ultraviolet absorbers and light stabilizers. The ultraviolet absorbers and light stabilizers may be organic and inorganic, and from the viewpoint of compatibility with the fluorinated polymer, organic ones are preferred.

That is, the fluorinated polymer composition may contain both an organic ultraviolet absorber and an organic light stabilizer, or may contain only one of them.

The ultraviolet absorber is a compound that protects the present decorative film from ultraviolet rays.

As the ultraviolet absorber, a salicylate compound, a benzotriazole compound, a benzophenone compound, a cyanoacrylate compound, or a triazine compound (preferably a hydroxyphenyl triazine compound) is preferred.

Specific examples of the organic ultraviolet absorber may be "Tinuvin 326" (molecular weight: 315.8, melting point: 139° C.), "Tinuvin 328-2" (molecular weight: 351, melting point: 82° C.), "Tinuvin 400" (molecular weight: 647), "Tinuvin 405" (molecular weight: 583.8, melting point: 74 to 77° C.), "Tinuvin 460" (molecular weight: 629.8, melting point: 93 to 102° C.), "Tinuvin 900" (molecular weight: 447.6, melting point: 137 to 141° C.), "Tinuvin 928" (molecular weight: 441.6, melting point: 109 to 113° C.), manufactured by BASF, "Sanduvor VSU powder" (molecular weight: 312.0, melting point: 123 to 127° C.) manufactured by Clariant, and "Hastavin PR-25 Gran" (molecular weight: 250.0, melting point: 55 to 59° C.) manufactured by Clariant.

As the ultraviolet absorber, two or more types may be used in combination.

In a case where the top layer contains a ultraviolet absorber, from the viewpoint of the total light transmittance of the top layer, the content of the ultraviolet absorber is preferably from 0.001 to 10 mass %, particularly preferably from 0.1 to 5 mass %, to the total mass of the top layer.

The light stabilizer is a compound to improve the light resistance of the present decorative film.

As the light stabilizer, a hindered amine compound is preferred. Specific examples of the hindered amine compound may be "Tinuvin 111FDL" (molecular weight: 2,000 to 4,000, melting point: 63° C.), "Tinuvin 144" (molecular weight: 685, melting point: 146 to 150° C.), "Tinuvin 152" (molecular weight: 756.6, melting point: 83 to 90° C.), "Tinuvin 292" (molecular weight: 508.8, melting point: 20° C.), manufactured by BASF, "Sanduvor 3051 powder" (molecular weight: 364.0, melting point: 225° C.) manufactured Clariant, "Sanduvor 3070 powder" (molecular weight: 1,500, melting point: 148° C.) manufactured by Clariant, and "VP Sanduvor PR-31" (molecular weight: 529, melting point: 120 to 125° C.) manufactured by Clariant. As the light stabilizer, two or more types may be used in combination.

In a case where the top layer contains a light stabilizer, the content of the light stabilizer is preferably from 0.01 to 15 mass %, particularly preferably from 0.1 to 3 mass %, to the total mass of the top layer.

The top layer may contain a resin other than the fluorinated polymer.

Specific examples of the resin other than the fluorinated polymer may be, other than the above-described non-fluorinated compound having a polyether chain, etc., an alkyd resin, an amino alkyd resin, an epoxy resin, an urethane resin, a vinyl acetate resin, a (meth)acrylic resin, a vinyl chloride resin, a phenol resin, an acrylic silicone resin and a silicone resin. Their content may be adjusted so that Wa to We of the present decorative film will be within the predetermined ranges.

As the case requires, the top layer may contain components other than as described above, for example, a filler (an inorganic filler such as silica, an organic filler such as resin beads, etc.), a matting agent, a leveling agent, a surface modifier, a degassing agent, a packing agent, a heat stabilizer, a thickener, a dispersing agent, a surfactant, an antistatic agent, a rust inhibitor, a silane coupling agent, an antifouling agent and a low pollution treatment agent.

The thickness of the top layer is preferably from 1 to 200 μm, particularly preferably from 5 to 100 μm. The present decorative film is excellent in moldability even if it is a thin or thick film.

The total light transmittance of the top layer is preferably at least 70%, more preferably at least 80%, particularly preferably at least 90%, from the viewpoint of the design property of the decorative film-attached three dimensional molded product of the present invention. Further, in the case of using an ultraviolet absorber as mentioned above, it is preferred to add it so that the total light transmittance of the top layer is adjusted to be within the above range.

The top layer is preferably formed by using a composition containing a fluorinated polymer (hereinafter referred to also as a composition (s)). The fluorinated polymer which the composition (s) contains, is preferably the fluorinated polymer $F^O$ as described in the top layer. The details of the fluorinated polymer $F^O$ are as described above, and the preferred embodiments are also the same, and therefore, their description will be omitted.

From the viewpoint of weather resistance of the present decorative film, the content of the fluorinated polymer in the composition (s) is preferably from 5 to 90 mass %, more preferably from 10 to 80 mass %, particularly preferably from 40 to 80 mass %, to the total mass of the solid content which the composition (s) contains.

Further, the composition (s) may contain at least one type selected from the group consisting of a curing agent, a non-fluorinated compound having a polyether chain, a curing catalyst, a ultraviolet absorber and a light stabilizer, a resin other than the fluorinated polymer, and the above-mentioned components which the top layer may contain, and since the details of the respective ones are the same as described above, their description will be omitted.

In a case where the composition (s) contains a curing agent, the content of the curing agent is preferably from 10 to 200 parts by mass, particularly preferably from 50 to 150 parts by mass, to 100 parts by mass of the fluorinated polymer in the composition (s).

The content of the non-fluorinated compound having a polyether chain, etc. in the composition (s), is preferably from 0.1 to 90 parts by mass, more preferably from 0.5 to 30 parts by mass, further preferably from 1 to 25 parts by mass, particularly preferably from 3 to 20 parts by mass, to 100 parts by mass of the fluorinated polymer.

In a case where the composition (s) contains a ultraviolet absorber, the content of the ultraviolet absorber is preferably from 0.001 to 10 mass %, particularly preferably from 0.1 to 5 mass %, to the mass of the total solid contents which the composition (s) contains, from the viewpoint of the total light transmittance of the top layer.

In a case where the composition (s) contains a light stabilizer, the content of the light stabilizer is preferably from 0.01 to 15 mass %, particularly preferably from 0.1 to 3 mass %, to the mass of the total solid contents which the composition (s) contains.

From such a viewpoint that it is possible to form a uniform top layer, the composition (s) preferably contains a solvent (water, organic solvent, etc.) for dissolving or dispersing the respective principal components which the composition (s) comprises. As the solvent, an organic solvent is preferred. As the organic solvent, a solvent such as an alcohol, a ketone, an ester, or a hydrocarbon, is preferred. As the solvent, two or more types may be used in combination.

In a case where the composition (s) contains a solvent, the proportion of the solid contents to the total mass of the composition (s) is preferably from 10 to 90 mass %, particularly preferably from 40 to 80 mass %.

The present decorative film may have a design layer. The design layer is a layer to impart a design property to a three dimensional molded product.

Specific examples of the design layer may be a layer formed by using a composition for forming a design layer (hereinafter referred to also as a composition (d)), a layer formed by a printing method, and a layer formed by a metal vapor deposition method.

The design layer formed by using the composition (d) is preferably formed by applying a composition (d). Components to be contained in the composition (d) may be a binder resin (urethane resin, (meth) acrylic resin, etc.), and a colorant (a dye, an organic pigment, an inorganic pigment, a luster pigment using a metal or mica, etc.), and such components may be dissolved or dispersed in a solvent (water, an organic solvent, etc.), etc.

The layer formed by a printing method, is formed by using an ink (containing e.g. a binder resin, a colorant, a solvent) suitable for each printing method such as inkjet printing, screen printing, offset printing or flexographic printing.

The layer formed by a metal vapor deposition method may be formed by using, for example, a metal such as aluminum, indium or tin.

The design layer may optionally contain components other than those described above, specifically, components mentioned in the composition (a), and components mentioned in the composition (s).

The thickness of the design layer is not particularly limited and may be suitably set depending on the particular application.

The present decorative film may have a layer other than as described above, for example, a release layer or a protective layer.

The release layer is a layer that may be provided in a case where the base film is finally peeled off. The release layer may be formed by using, for example, a silicone release agent.

The protective layer is a layer which may be provided for the purpose of protecting the design layer, and is preferably provided so that it is in contact with the design layer. The protective layer may be formed by using a resin such as a (meth)acrylic resin, an urethane resin or an ABS resin.

Each layer other than the base film constituting the present decorative film may be formed, for example, by preparing each composition having components to form each layer dissolved in a solvent (water, an organic solvents, etc.) and applying it on the desired layer, followed by drying.

A specific example of the coating method for forming each layer may be a method using a spray, an applicator, a die coater, a bar coater, a roll coater, a comma coater, a roller brush, a brush, or a spatula.

After application of each composition, in order to remove the solvent in the composition, or in a case where each composition contains a curable component (in the case of the above embodiment 2), in order to cure the component, it is preferred to carry out heating. The heating temperature for removing the solvent in the composition is preferably from 0 to 50° C. The heating temperature for curing the composition is preferably from 50 to 150° C. In the case of the above embodiment 3, in order to remove the solvent and, at the same time, not to let the curing agent be reacted, it is preferred to conduct heating at a temperature which is lower than a reaction starting temperature of the curing agent and which is a temperature capable of removing the solvent. The heating time is usually from 1 minute to 2 weeks.

Here, in a case where the composition (s) to be used to form the top layer is so-called a powder type not containing a solvent, the top layer may be formed also by e.g. electrostatic coating. Even in such a case, in the case of the embodiment 2, it is preferred to conduct heating in order to cure the fluorinated polymer $F^O$. In such a case, the heating temperature for curing the composition is preferably from 100 to 300° C.

Further, as described above, the design layer may be formed by a method other than coating (a printing method or a vapor deposition method).

Further, the top layer or the bonding layer may preliminarily be formed into a film shape, which may then be laminated on an optional layer.

Wa and Wb of the top layer as measured by using a wave scan apparatus in such a state that the present decorative film is stretched by 1.5 times, are both at most 30.0. Thus, at the time of bonding the present decorative film to a three dimensional molded product in a stretched state, formation of wrinkles of the present decorative film will be suppressed.

Such a state that the present decorative film is stretched by 1.5 times means a state where the present decorative film cut into a size of 10 mm×150 mm is stretched at an elongation of 1.5 times in accordance with JIS K7127: 1999, under conditions of the test piece type 2, a distance between chucks of 50 mm, a tensile speed of 50 mm/min and a temperature of 23° C.

Wa and Wb of the top layer are measured by using a wave scan apparatus in such a state that the present decorative film is stretched by 1.5 times, by moving the wave scan apparatus by 5 cm along with the stretching direction of the present decorative film, while applying a laser beam to the top layer at an angle of 60° inclined from the normal direction of the top layer.

Further, a specific example of the wave scan apparatus is as described above.

Wa and Wb of the top layer in such a state that the present decorative film is stretched by 1.5 times are respectively preferably at most 25.0, particularly preferably at most 20.0. The lower limit values of Wa and Wb are, respectively, at least 5.0.

When the above Wa or Wb is at most 25.0, at the time of bonding the present decorative film to a three dimensional molded product in a stretched state, formation of wrinkles of the present decorative film will be more suppressed.

Particularly when both Wa and Wb are at most 25.0, at the time of bonding the present decorative film to a three dimensional molded product in a stretched state, formation of wrinkles of the present decorative film will be further suppressed.

Wc and Wd of the top layer as measured by using a wave scan apparatus in such a state that the present decorative film is stretched by 1.5 times, are both preferably at most 30.0. Wc and Wd are measured by the same method as for Wa and Wb.

Here, Wc and Wd are indices to be used to judge large irregularities present on the surface, as compared to Wa and Wb, and as the values of Wc and Wd are smaller, it is judged that large irregularities are less. At the time of bonding the present decorative film to a three dimensional molded product in such a state that the present decorative film is stretched, if large irregularities are less on the surface of the decorative film, it is possible to prevent spaces from forming between the three dimensional molded product and the decorative film, whereby the adhesion between the present decorative film and the three dimensional molded product will be improved. As a result, formation of wrinkles of the present decorative film is presumed to be more suppressed.

Wc and Wd of the top layer in such a state that the present decorative film is stretched by 1.5 times, are, respectively, more preferably at most 25.0, particularly preferably at most 20.0. The lower limit values for Wc and Wd are, respectively, at least 5.0.

When Wc or Wd is at most 25.0, at the time of bonding the present decorative film to a three dimensional molded product in a stretched state, formation of wrinkles of the present decorative film will be more suppressed.

Particularly when both of Wc and Wd are at most 25.0, at the time of bonding the present decorative film to a three dimensional molded product in a stretched state, formation of wrinkles of the present decorative film will be further suppressed.

The arithmetic mean value of Wa, Wb, Wc and Wd is preferably at most 25.0, particularly preferably at most 20.0. Thus, at the time of bonding the present decorative film to a three dimensional molded product in a stretched state, formation of wrinkles of the present decorative film will be further suppressed.

We of the top layer as measured by using a wave scan apparatus in such a state that the present decorative film is stretched by 1.5 times, is preferably at most 30.0, more preferably at most 25.0, particularly preferably at most 20.0. We is measured by the same method as for Wa to Wd.

Here, we can judge irregularities of a larger size than Wc and Wd, and as the value of We is smaller, it is judged that large irregularities are less on the surface. At the time of bonding the present decorative film to a three dimensional molded product in a stretched state, in a case where large irregularities are less on the surface, it is presumed that the film thickness of the present decorative film is uniform, and formation of wrinkles of the present decorative film will be further suppressed.

The standard deviation when the 60 degree specular gloss of the top layer is measured at 20 points in 30 cm$^2$ in such a state that the present decorative film is stretched by 1.5 times, is preferably from 0.1 to 0.5, more preferably from 0.1 to 0.4, particularly preferably from 0.1 to 0.3. When the standard deviation of the 60 degree specular gloss of the top layer at the time of stretching of the decorative film is within the above range, it can be said that at the time of stretching of the decorative film, the surface of the top layer stretched together is in such a state that irregularities are less, whereby formation of wrinkles of the present decorative film will be further suppressed.

Specifically, the above standard deviation of the 60 degree specular gloss is calculated by selecting an optional region (30 cm$^2$) at the surface of the top layer at the time of stretching, and on the basis of the 60 degree specular gloss at 20 points measured at equal intervals in this region.

The standard deviation when the thickness of the present decorative film is measured at 20 points in 30 cm$^2$ in such a state that the present decorative film is stretched by 1.5 times, is preferably from 0.1 to 0.5 µm, more preferably from 0.1 to 0.4 µm, particularly preferably from 0.1 to 0.3 µm. When the standard deviation of the film thickness at the time of stretching of the present decorative film is within the above range, at the time of bonding the present decorative film to a three dimensional molded product in a stretched state, the top layer is in such a state that irregularities on its surface are less, whereby formation of wrinkles of the present decorative film will be further suppressed. Further, it is considered that in such a state that the present decorative film is stretched, a difference in hue such as color unevenness is less likely to occur.

Specifically, the above standard deviation of the film thickness is calculated by selecting an optional region (30 cm$^2$) at the surface of the decorative film at the time of stretching, and on the basis of the film thickness at 20 points measured at equal intervals in this region.

The present decorative film is preferably used as stretched, more preferably used as stretched by at least 1.5 times, in order to impart a design property to an object to be decorated (e.g. a three dimensional molded product as described later) or to protect the surface of the object to be decorated. At the time of using the present decorative film, the stretching direction and the stretching method may be suitably selected depending on the shape of the object to be decorated, the production conditions at the time of molding, etc. The stretching direction may be any direction, and the stretching method may be any method. That is, stretching of the present decorative film may be conducted by pulling the present decorative film in a predetermined one direction or all directions, and the present decorative film may be suitably heated and expanded.

With the present decorative film, since the surface shape in the case where it is stretched by 1.5 times is adjusted, even in a case where it is stretched at a desired magnification (e.g. from 1.1 to 3.0 times, preferably from 1.2 to 2.0 times), it is possible to obtain a good effect for preventing wrinkles.

The present decorative film is suitably used for decorating a three dimensional molded product to be used as an automobile exterior member or an automobile interior member. Specific examples of the three dimensional molded product to be used as an automobile exterior member and an automobile interior member will be described later.

The decorative film-attached three dimensional molded product of the present invention (hereinafter referred to also as the present molded product) is obtainable by press-bonding the present decorative film and the surface to be decorated, of a three dimensional molded product, under a reduced pressure.

The press-bonding method under a reduced pressure in the method for producing the present molded product, is referred to also as a vacuum forming method (an overlay molding method), and it may be carried out, for example, by using a double-sided vacuum forming device.

Under a reduced pressure means a state where the pressure is lower than the standard atmospheric pressure. The pressure under a reduced pressure is specifically preferably at most 70 kPa.

With the present molded product, after press-bonding the present decorative film and the surface to be decorated, of the three dimensional molded product, or at the same time as the press bonding, the decorative film may be heated. The heating temperature is preferably from 50 to 150° C. Further, in the case of the decorative film in the above-mentioned embodiment 3, by this heating, it is possible to react the fluorinated polymer F$^0$ and a curing agent in the fluorinated layer, to form a fluorinated layer containing a fluorinated polymer F$^1$.

Further, the decorative film-attached three dimensional molded product of the present invention may be obtained optionally by a molding method other than the vacuum forming method. Examples of such a molding method may be in-mold molding, in-mold transfer molding, in-mold lamination molding, overlay transfer molding, overlay lamination molding, water pressure transfer, etc. Otherwise, the decorative film may be press-bonded to a three dimensional molded product before molding, followed by processing to obtain a decorative film-attached three dimensional molded product.

Specific examples of the material constituting the three dimensional molded product may be polypropylene, an ABS resin and polycarbonate.

Specific examples of the three dimensional molded product may be automobile exterior members such as a door mirror, a front under spoiler, a rear under spoiler, a side under skirt, a bumper, a side garnish, etc., and automobile interior members such as a center console, an instrument panel, a door switch panel, etc. The present decorative film may be suitably used also for a liquid crystal surface of a display, a wall material, a labeling billboard, etc.

With the decorative film of the present invention, since the surface condition in the case of being stretched by 1.5 times, is suitably designed, wrinkles of the decorative film in a molded product are less likely to occur, even in a case where variations are likely to occur in the stretched state of the decorative film, like in a case where the object to be decorated has a complicated shape, or in a case where the object to be decorated is a member with a large area. In particular, wrinkles of the film in the member having a complicated shape, and the difference in the surface condition between the edge portion and the central portion in the member having a large area, are likely to be problems, but by the decorative film of the present invention, it is possible to solve the problems. Therefore, the decorative film of the present invention may be particularly suitably applied to a vehicle interior member having a complicated shape in many cases, and to a vehicle exterior member having a large area in many cases.

EXAMPLES

Hereinafter the present invention will be described in detail with reference to Examples. However, the present invention is not limited to these Examples. The blend amount of each component in Table given later represents the mass. Further, Ex. 1 to 4 are Examples of the present invention, and Ex. 5 and 6 are Comparative Examples.

<Abbreviations and Details of Components Used>

Polymer 1 solution to polymer 3 solution: Produced in accordance with Ex. 1 to 3 by using monomers selected from chlorotrifluoroethylene (CTFE), 4-hydroxybutyl vinyl ether (HBVE), cyclohexyl vinyl ether (CHVE) and ethyl vinyl ether (EVE).

Polymer 4 solution: One (Tg: −40° C.) prepared by adjusting KYNAR761 (polyvinylidene fluoride manufactured by Arkema) to a polymer concentration of 50 mass % by N-methyl-2-pyrrolidone.

Polymer 5 solution: ACRYDIC A-801 P (a mixed solution of an isocyanate curing acrylic resin in toluene and butyl acetate, manufactured by DIC Corporation)

(Additives)

Curing agent 1: E405-70B (a compound (adduct) having two or more isocyanate groups in one molecule, manufactured by Asahi Kasei Corporation)

Curing agent 2: BURNOCK DN-980 (a compound (isocyanurate) having two or more isocyanate groups in one molecule, manufactured by DIC Corporation)

Curing catalyst: ADEKA STAB BT-11 (manufactured by ADEKA Corporation)

Compound (1A): Polyoxypropylene triol (glycerin-propylene oxide adduct, molecular weight: 3,000), corresponding to the above-mentioned compound (1)

Compound (1B): Polycizer W-230-H (a carboxy group-containing aliphatic polyester, manufactured by DIC Corporation, molecular weight: 1,000), corresponding to the above-mentioned compound (1)

Ultraviolet absorber: TINUVIN 384-2 (manufactured by BASF)

Light stabilizer: TINUVIN 123 (manufactured by BASF)

Surface conditioner: KF69 (dimethyl silicone oil, manufactured by Shin-Etsu Silicone Co., Ltd.)

Production Example for Polymer 1

Into an autoclave, xylene (503 g), ethanol (142 g), CTFE (387 g), CHVE (326 g), HBVE (84.9 g), potassium carbonate (12.3 g) and a 50 mass % xylene solution (20 mL) of tert-butyl peroxypivalate were introduced, heated and polymerized at 65° C. for 11 hours. Subsequently, the solution in the autoclave was filtered, and after obtaining a xylene solution containing the polymer 1 being a fluorinated polymer, solvent substitution was conducted by butyl acetate, to obtain a butyl acetate solution containing the polymer 1 (polymer 1 solution, polymer concentration: 50 mass %).

The polymer 1 was a polymer comprising units based on CTFE, units based on CHVE, and units based on HBVE in amounts of 50 mol %, 39 mol % and 11 mol % in this order, to all units which the polymer 1 comprised. The hydroxy value of the polymer 1 was 50 mgKOH/g, Tg was 52° C., and Mn was 10,000.

Production Example for Polymer 2

A butyl acetate solution containing the polymer 2 as a fluorinated polymer (polymer 2 solution, polymer concentration: 50 mass %) was obtained in the same manner except that the amounts of the monomers to be used were changed.

The polymer 2 was a polymer comprising units based on CTFE, units based on CHVE and units based on HBVE in amounts of 50 mol %, 25 mol % and 25 mol %, in this order, to all units which the polymer 2 comprised. The hydroxy value of the polymer 2 was 118 mgKOH/g, Tg was 45° C., and Mn was 7,000.

Production Example for Polymer 3

A butyl acetate solution containing the polymer 3 as a fluorinated polymer (polymer 3 solution, polymer concentration: 50 mass %) was obtained in the same manner except that EVE was added as a monomer to be used, and the amounts of the monomers to be used were further changed.

The polymer 3 was a polymer comprising units based on CTFE, units based on EVE, units based on CHVE and units based on HBVE in amounts of 50 mol %, 25 mol %, 15 mol % and 10 mol %, in this order, in all units which the polymer 3 comprised. The hydroxy value of the polymer 3 was 52 mgKOH/g, Tg was 40° C., and Mn was 20,000.

[Ex. 1]
<Production of Composition (s)>

The respective components in the column for "Components contained in composition (s)" disclosed in Ex 1 in Table 1 were mixed to obtain a composition (s1). The details of added amounts of the respective components are shown in Table 1 given later.

<Production of Decorative Film>

On a base film (a polyethylene terephthalate film), the composition (s1) was applied by using an applicator, and dried and cured at 80° C. for 5 minutes, to form a top layer made of a cured coating film having an average thickness of 20 μm.

Then, in the base film, on the surface on which the top layer was not formed, the composition (d1) (TU240 FDSS, manufactured by Toyo Ink Co., Ltd.) was applied and heated at 80° C. for 5 minutes, to form a design layer made of a coating film having an average thickness of 10 μm.

Then, on the above design layer, the composition (a1) (acrylic adhesive) was applied and heated at 80° C. for 5 minutes, to form a bonding layer made of a coating film having an average thickness of 20 μm.

By the above method, a decorative film (1) was obtained in which the top layer, the base film, the design layer and the bonding layer were disposed in this order.

<Production of Molded Product>

Using a double-sided vacuum forming apparatus, the decorative film (1) and a substrate (a three dimensional molded product, a plate-shaped resin molded product with length 250 mm×width 100 mm×thickness 3 mm, made of a polyolefin resin (TSOP GP6BS, manufactured by Prime Polymer Co., Ltd.)) were heated at 140° C. for 1 minute while being press-bonded under a reduced pressure by TOM molding (overlay molding), to obtain a molded product (1) being a decorative film-attached three dimensional molded product. The depth of the box-shaped recess of the TOM molding machine was adjusted so that the distance from the set decorative film (1) to the bottom surface of the box-shaped recess would be 85 mm. Thus, at the time of the TOM molding, the decorative film (1) was bonded to the substrate while being stretched by 1.5 times. The obtained molded product (1) was subjected to evaluations as described below.

[Ex. 2 to 6]

Components disclosed in Ex. 2 to 6 in Table 1 were respectively mixed to obtain compositions (s2) to (s6).

In the same manner as in Ex. 1 except that the composition (s1) was changed to each of compositions (s2) to (s6), the decorative films (2) to (6) and the molded products (2) to (6) were obtained and subjected to evaluations as described below. The evaluation results are shown in Table 1 given below.

<Evaluation Methods>

[Uniformity 1]

The uniformity of a decorative film was evaluated by the following method.

Using Wavescan AW-4840 (manufactured by BYK), Wa, Wb, Wc and Wd at the surface of the top layer of the decorative film stretched by 1.5 times were measured under the following conditions.

Specifically, while irradiating a laser beam to the top layer at an angle inclined by 60 degrees from the normal direction of the top layer, the measurements were made by moving the wave scan apparatus for 5 cm in the stretching direction of the decorative film.

Here, the decorative film stretched by 1.5 times was obtained by cutting each decorative film obtained by the above-described production method into a size of 10 mm×150 mm, followed by stretching at a stretching rate of 1.5 times in accordance with JIS K7127: 1999, under conditions of the test piece type 2, the distance between chucks being 50 mm, the pulling rate being 50 mm/min and the temperature being 23° C.

[Uniformity 2]

The uniformity of a decorative film was evaluated by the following method.

The 60 degree specular gloss at the surface of the top layer of the decorative film stretched by 1.5 times, was measured by JIS K5600-4-7.

Specifically, for the measurement of the 60 degree specular gloss, a variable angle glossmeter (trade name "UGV-6P", incident reflection angle: 60 degrees, manufactured by Suga Test Instruments Co., Ltd.) was used, and measurements were made at 20 points at the lattice points of the vertical and horizontal 10 mm intervals in a region of 30 cm², at the surface of the top layer in the decorative film stretched by 1.5 times, whereupon the standard deviation X was calculated.

Here, the decorative film stretched by 1.5 times, is as shown in [Uniformity 1 of decorative film].

[Uniformity 3]

The uniformity of a decorative film was evaluated by the following method.

By using an eddy current film thickness meter EDY-5000 (manufactured by Sanko Electronic Laboratory Co., Ltd.), the thickness of the decorative film stretched by 1.5 times was measured at 20 points at the lattice points of the vertical and horizontal 10 mm intervals, in a region of 30 cm² of the decorative film stretched by 1.5 times, whereupon the standard deviation Y (μm) was calculated. Here, the decorative film stretched by 1.5 times, is as shown in [Uniformity 1 of decorative film].

[Appearance of Molded Product]

The appearance of a molded product was confirmed by visual observation, and the appearance of the molded product was evaluated in accordance with the following standards.

S: Wrinkles are not observed at the decorative film portion of the molded product.

A: Wrinkles are observed at the decorative film portion of the molded product, and the portion where the wrinkles are formed, is less than 10% to the surface area of the molded product.

B: Wrinkles are observed in the decorative film portion of the molded product, and the portion where the wrinkles are formed, is at least 10% and less than 50% to the surface area of the molded product.

C: Wrinkles are observed in the decorative film portion of the molded product, and the portion where the wrinkles are formed, is at least 50% to the surface area of the molded product. In addition, occurrence of tear is observed.

The evaluation results are shown in Table 1.

Here, Wm in the Table represents the arithmetic mean value of Wa, Wb, Wc and Wd.

TABLE 1

| No. of decorative film and molded product | | | Ex. 1 (1) | Ex. 2 (2) | Ex. 3 (3) | Ex. 4 (4) | Ex. 5 (5) | Ex. 6 (6) |
|---|---|---|---|---|---|---|---|---|
| Components (g) contained in composition (s) | Polymer 1 solution | | 100.0 | 100.0 | | 25.0 | | |
| | Polymer 2 solution | | | | 100.0 | | | |
| | Polymer 3 solution | | | | | 75.0 | | |
| | Polymer 4 solution | | | | | | 100.0 | |
| | Polymer 5 solution | | | | | | | 100.0 |
| | Curing agent 1 | | 44.0 | 44.0 | | 44.0 | | |
| | Curing agent 2 | | | | 90.0 | | | 25.0 |
| | Curing catalyst | | 0.0010 | 0.0010 | 0.0010 | 0.0010 | | |
| | Compound 1A | | 2.50 | | 2.50 | 2.50 | 2.50 | 2.50 |
| | Compound 1B | | | 2.50 | | | | |
| | Ultraviolet absorber | | 1.5 | 1.5 | 1.5 | 1.5 | 1.5 | 1.5 |
| | Light stabilizer | | 1.5 | 1.5 | 1.5 | 1.5 | 1.5 | 1.5 |
| | Surface conditioner | | 0.1 | 0.1 | 0.1 | 0.1 | 0.1 | 0.1 |
| Evaluation results | Uniformity 1 | Wa | 10.8 | 22.0 | 11.2 | 11.1 | 30.1 | 35.5 |
| | | Wb | 9.2 | 20.2 | 10.5 | 10.8 | 28.2 | 32.2 |
| | | Wc | 8.6 | 19.8 | 8.8 | 8.5 | 27.7 | 29.5 |
| | | Wd | 8.5 | 18.7 | 7.9 | 8.3 | 25.8 | 27.8 |
| | | Wm | 9.3 | 20.2 | 9.6 | 9.7 | 28.0 | 31.3 |
| | Uniformity 2 | X | 0.2 | 0.3 | 0.2 | 0.3 | 1.2 | 0.8 |
| | Uniformity 3 | Y | 0.3 | 0.3 | 0.3 | 0.3 | 1.5 | 0.7 |
| | Appearance of molded product | | S | A | S | S | C | C |

As shown in Table 1, it has been confirmed that when Wa and Wb are both at most 30 (Ex. 1 to 4), formation of wrinkles is less in the decorative film portion of the molded product, and the appearance is good.

This application is a continuation of PCT Application No. PCT/JP2018/046975, filed on Dec. 20, 2018, which is based upon and claims the benefit of priority from Japanese Patent Application No. 2017-243932 filed on Dec. 20, 2017. The contents of those applications are incorporated herein by reference in their entireties.

REFERENCE SYMBOLS

10: decorative film
12: bonding layer
14: base film
16: top layer

What is claimed is:

1. A decorative film, comprising:
a base film; and
a top layer comprising a fluorinated polymer;
wherein:
the top layer is disposed on one surface of the base film;
a surface reflection intensity Wa at a wavelength of from 0.1 to 0.3 mm, and a surface reflection intensity Wb at a wavelength of from 0.3 to 1.0 mm, of the top layer as measured by using a wave scan apparatus, in such a state that the decorative film is stretched by 1.5 times, are both at most 30.0;
the fluorinated polymer is a fluorinated polymer having crosslinkable groups or a crosslinked fluorinated polymer formed by letting the fluorinated polymer having crosslinkable groups be crosslinked;
the fluorinated polymer having crosslinkable groups comprises:
at least one unit based on a fluoroolefin;

at least one unit based on at least one monomer selected from the group consisting of a vinyl ether, a vinyl ester, an allyl ether, an allyl ester, and a (meth)acrylic acid ester; and at least one unit having a crosslinkable group;

a content of units having a crosslinkable group in the fluorinated polymer having crosslinkable groups is from 0.5 to 35 mol % relative to all units of the fluorinated polymer having crosslinkable groups; and the fluorinated polymer having crosslinkable groups comprises a polymer having a glass transition temperature of less than 50° C. and a polymer having a glass transition temperature of at least 50° C.

2. The decorative film according to claim 1, wherein a surface reflection intensity Wc at a wavelength of from 1.0 to 3.0 mm, and a surface reflection intensity Wd at a wavelength of from 3.0 to 10.0 mm, of the top layer as measured by using a wave scan apparatus, in such a state that the decorative film is stretched by 1.5 times, are both at most 30.0.

3. The decorative film according to claim 2, wherein an arithmetic mean value of Wa, Wb, Wc, and Wd is at most 25.0.

4. The decorative film according to claim 1, wherein a standard deviation when a 60-degree specular gloss of the top layer is measured at 20 points in such a state that the decorative film is stretched by 1.5 times, is from 0.1 to 0.5.

5. The decorative film according to claim 1, wherein a standard deviation when a film thickness of the decorative film is measured at 20 points in such a state that the decorative film is stretched by 1.5 times, is from 0.1 to 0.5 μm.

6. The decorative film according to claim 1, wherein the glass transition temperatures of the fluorinated polymers having crosslinkable groups are from 25 to 120° C.

7. The decorative film according to claim 1, wherein the crosslinkable groups of the fluorinated polymers having crosslinkable groups are hydroxy groups or carboxy groups.

8. The decorative film according to claim 1, wherein a number average molecular weight of each fluorinated polymer having crosslinkable groups is from 3,000 to 30,000.

9. The decorative film according to claim 1, wherein the top layer comprises the crosslinked fluorinated polymer.

10. The decorative film according to claim 9, wherein:

the crosslinked fluorinated polymer is formed from a composition comprising the fluorinated polymer having crosslinkable groups, a curing agent, and a solvent;

the composition comprises solid contents in an amount of from 10 to 90 mass % based on a total mass of the composition; and containing the composition comprises the fluorinated polymer having crosslinkable groups in an amount of from 5 to 90 mass % based on a total mass of the solid contents.

11. The decorative film according to claim 1, further comprising a bonding layer.

12. A three dimensional product comprising the decorative film according to claim 1, wherein the three dimensional molded product is in a form selected from the group consisting of an automobile exterior member and an automobile interior member.

13. A method for producing a decorative film-attached three dimensional molded product, comprising press-bonding the decorative film according to claim 1 to a surface of a three dimensional molded product under a reduced pressure, to obtain a decorative film-attached three dimensional molded product having the top layer as an outermost surface.

* * * * *